(12) United States Patent
Perlmutter et al.

(10) Patent No.: US 11,301,376 B2
(45) Date of Patent: Apr. 12, 2022

(54) DATA STORAGE DEVICE WITH WEAR RANGE OPTIMIZATION

(71) Applicant: Seagate Technology LLC, Cupertino, CA (US)

(72) Inventors: Stephen H. Perlmutter, Louisville, CO (US); Kyumsung Lee, Louisville, CO (US)

(73) Assignee: Seagate Technology LLC

( * ) Notice: Subject to any disclaimer, the term of this patent is extended or adjusted under 35 U.S.C. 154(b) by 554 days.

(21) Appl. No.: 16/263,606

(22) Filed: Jan. 31, 2019

(65) Prior Publication Data

US 2019/0377674 A1 Dec. 12, 2019

Related U.S. Application Data

(60) Provisional application No. 62/683,405, filed on Jun. 11, 2018.

(51) Int. Cl.
*G06F 12/02* (2006.01)

(52) U.S. Cl.
CPC ...... *G06F 12/0261* (2013.01); *G06F 12/0246* (2013.01); *G06F 2212/702* (2013.01); *G06F 2212/7205* (2013.01)

(58) Field of Classification Search
CPC ............. G06F 12/0261; G06F 12/0246; G06F 2212/7205; G06F 2212/702; G06F 2212/7211
See application file for complete search history.

(56) References Cited

U.S. PATENT DOCUMENTS

| | | | |
|---|---|---|---|
| 6,831,865 B2 | 12/2004 | Chang et al. | |
| 7,409,489 B2 | 8/2008 | Sinclair | |
| 8,938,597 B2 | 1/2015 | Goss et al. | |
| 11,016,679 B2* | 5/2021 | Secatch | G06F 3/0679 |
| 2012/0023144 A1* | 1/2012 | Rub | G06F 12/0246 707/813 |
| 2016/0098229 A1* | 4/2016 | Schreiber | G06F 9/5022 711/166 |
| 2017/0131947 A1* | 5/2017 | Hoang | G06F 11/00 |
| 2017/0131948 A1* | 5/2017 | Hoang | G06F 3/0653 |
| 2017/0212678 A1* | 7/2017 | Blount | G06F 3/0659 |
| 2019/0042413 A1* | 2/2019 | Wysocki | G06F 11/108 |

* cited by examiner

*Primary Examiner* — Sean D Rossiter
(74) *Attorney, Agent, or Firm* — Hall Estill Law Firm (57) ABSTRACT

A data storage device can be arranged with a semiconductor memory having a plurality of erasure blocks accessed by a controller to store data. An access count for each respective erasure block can be generated to allow a wear range for the semiconductor memory to be computed based on the respective access counts with the controller. A performance impact of the wear range is evaluated with the controller in order to intelligently alter a deterministic window of a first erasure block of the plurality of erasure blocks in response to the performance impact.

20 Claims, 5 Drawing Sheets

DATA STORAGE DEVICE WITH WEAR RANGE OPTIMIZATION

RELATED APPLICATION

The present application makes a claim of domestic priority to U.S. Provisional Patent Application No. 62/683,405 filed Jun. 11, 2018, the contents of which are hereby incorporated by reference.

SUMMARY

Various embodiments of the present disclosure are generally directed to the management of data maintenance operations in a memory, such as, but not limited to, a flash memory in a solid state drive (SSD).

A data storage device, in some embodiments, has a semiconductor memory arranged into a plurality of erasure blocks accessed by a controller to store data. A data access count is generated for each respective erasure block, which allows a wear range to be computed for the semiconductor memory based on the respective data access counts. A performance impact of the wear range is evaluated with the controller to determine how a deterministic window of a first erasure block of the plurality of erasure blocks can be altered to optimize performance.

Other embodiments arrange a semiconductor memory into a plurality of erasure blocks accessed by a controller to store data to allow an access count for each respective erasure block to be generated. A wear range is computed for the semiconductor memory based on the respective access counts with the controller and the access counts are evaluated to determine a performance impact with the controller. A range mitigation strategy is then generated and executed with the controller in response to the performance impact to alter a deterministic window of a first erasure block of the plurality of erasure blocks.

A semiconductor memory ha a plurality of erasure blocks connected to a controller, in accordance with various embodiments, with each respective erasure block having an access count corresponding with a number of data accesses and a wear range computed by the controller based on the respective access counts. The controller is configured to evaluate a performance impact of the wear range and alter a deterministic window of a first erasure block of the plurality of erasure blocks in response to the performance impact.

DETAILED DESCRIPTION

Without limitation, the various embodiments disclosed herein are generally directed to managing data maintenance and background operations in a data storage device to optimize the wear range between different logical portions of a memory.

Solid state drives (SSDs) are data storage devices that store user data in non-volatile memory (NVM) made up of an array of solid-state semiconductor memory cells. SSDs usually have an NVM module and a controller. The controller controls the transfer of data between the NVM and a host device. The NVM will usually be NAND flash memory, but other forms of solid-state memory can be used.

A flash memory module may be arranged as a series of dies. A die represents a separate, physical block of semiconductor memory cells. The controller communicates with the dies using a number of channels, or lanes, with each channel connected to a different subset of the dies. Any respective numbers of channels and dies can be used. Groups of dies may be arranged into NVMe sets in accordance with the NVMe (Non-Volatile Memory Express) Standard. This standard enables multiple owners (users) to access and control separate portions of a given SSD (or other memory device).

Metadata is often generated and used to describe and control the data stored to an SSD. The metadata may take the form of one or more map structures that track the locations of data blocks written to various GCUs (garbage collection units), which are sets of erasure blocks that are erased and allocated as a unit. The map structures can include a forward map and a reverse directory, although other forms can be used.

The forward map provides an overall map structure that can be accessed by a controller to service a received host access command (e.g., a write command, a read command, etc.). The forward map may take the form of a two-level map, where a first level of the map maintains the locations of map pages and a second level of the map provides a flash transition layer (FTL) to provide association of logical addresses of the data blocks to physical addresses at which the blocks are stored. Other forms of maps can be used including single level maps and three-or-more level maps, but each generally provides a forward map structure in which pointers may be used to point to each successive block until the most current version is located.

The reverse directory can be written to the various GCUs and provides local data identifying, by logical address, which data blocks are stored in the associated GCU. The reverse directory, also sometimes referred to as a footer, thus provides a physical to logical association for the locally stored blocks. As with the forward map, the reverse directory can take any number of suitable forms. Reverse directories are particularly useful during garbage collection operations, since a reverse directory can be used to determine which data blocks are still current and should be relocated before the associated erasure blocks in the GCU are erased.

SSDs expend a significant amount of resources on maintaining accurate and up-to-date map structures. Nevertheless, it is possible from time to time to have a mismatch between the forward map and the reverse directory for a given GCU. These situations are usually noted at the time of garbage collection. For example, the forward map may indicate that there are X valid data blocks in a given erasure block (EB), but the reverse directory identifies a different number Y valid blocks in the EB. When this type of mismatch occurs, the garbage collection operation may be rescheduled or may take a longer period of time to complete while the system obtains a correct count before proceeding with the recycling operation.

The NVMe specification provides that a storage device should have the ability to provide guaranteed levels of deterministic performance for specified periods of time (deterministic windows, or DWs). To the extent that a garbage collection operation is scheduled during a DW, it is desirable to ensure that the actual time that the garbage collection operation would require to complete is an accurate estimate in order for the system to decide whether and when to carry out the GC operation.

A data storage device can be optimized, in accordance with various embodiments, by minimizing the wear range between different logical portions of a memory. As explained below, some embodiments monitor the number of program/erase (PE) cycles for assorted logical erasure blocks (EB) of a memory to determine a wear range. A wear range is defined as a difference between the EB of a memory with the lowest number of PE cycles and the EB of the memory with the highest number of PE cycles. Hence, a wear range module of a data storage device can continuously, sporadically, or randomly monitor the number of PE cycles for various EBs and concurrently generate a wear range for some, or all, of the memory.

The ability to monitor the wear range of a memory in real-time allows the wear range module to trigger various corrective and preventative measures to reduce the wear range. For instance, the wear module can define normal wear range values where EB operations are carried out as scheduled by a host, such as a data storage device controller and urgent wear range values where EB operations are modified from scheduled activity to mitigate and reduce the wear range over time. Such wear range activity allows a data storage device to proactively and/or reactively limit the growth of a wear range without neglecting other data operation selection criteria, such as pendency time, security, and queued order.

Figure 1:
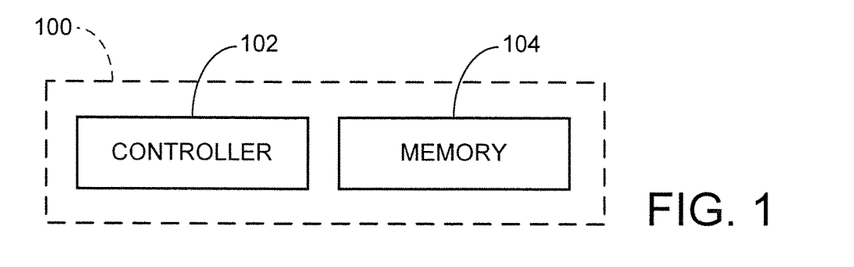
FIG. 1 provides a functional block representation of a data storage device in accordance with various embodiments.

These and other features may be practiced in a variety of different data storage devices, but various embodiments conduct wear range optimization in the example data storage device 100 shown as a simplified block representation in FIG. 1. The device 100 has a controller 102 and a memory module 104. The controller block 102 represents a hardware-based and/or programmable processor-based circuit configured to provide top level communication and control functions. The memory module 104 includes solid state non-volatile memory (NVM) for the storage of user data from one or more host devices 106, such as other data storage devices, network server, network node, or remote controller.

Figure 2:
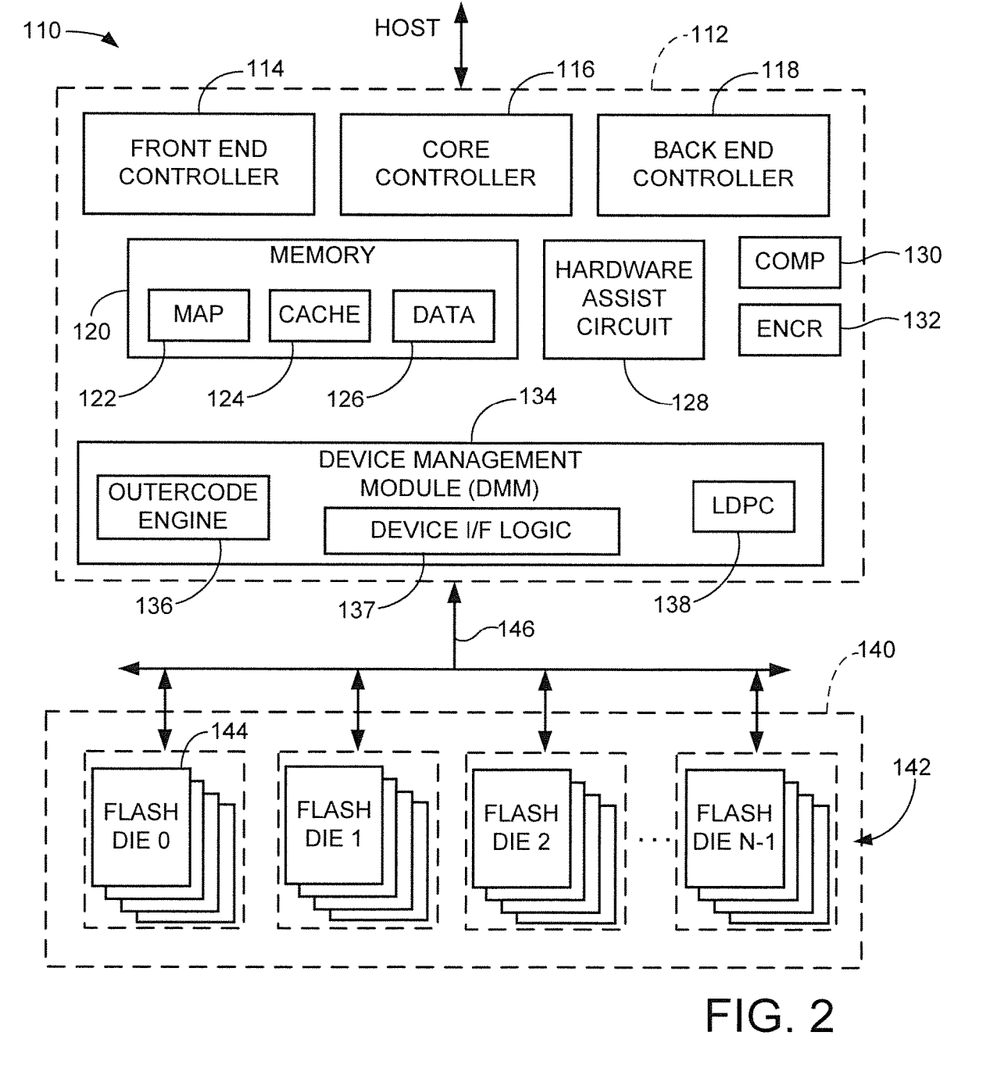
FIG. 2 shows aspects of the device of FIG. 1 characterized as a solid state drive (SSD) in accordance with some embodiments.

FIG. 2 displays an example data storage device 110 generally corresponding to the device 100 in FIG. 1. The device 110 is configured as a solid state drive (SSD) that communicates with one or more host devices via one or more Peripheral Component Interface Express (PCIe) ports, although other configurations can be used. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVMe sets (die sets) for use in the storage of data. Each NVMe set may form a portion of an NVMe Namespace that may span multiple SSDs or be contained within a single SSD.

The SSD 110 includes a controller circuit 112 with a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can also be used. The various controllers may be integrated into a single system on chip (SOC) integrated circuit device, or may be distributed among various discrete devices as required.

A controller memory 120 represents various forms of volatile and/or non-volatile memory (e.g., SRAM, DDR DRAM, flash, etc.) utilized as local memory by the controller 112. Various data structures and data sets may be stored by the memory including one or more map structures 122, one or more caches 124 for map data and other control information, and one or more data buffers 126 for the temporary storage of host (user) data during data transfers.

A non-processor based hardware assist circuit 128 may enable the offloading of certain memory management tasks by one or more of the controllers as required. The hardware circuit 128 does not utilize a programmable processor, but instead uses various forms of hardwired logic circuitry such as application specific integrated circuits (ASICs), gate logic circuits, field programmable gate arrays (FPGAs), etc.

Additional functional blocks can be realized in hardware and/or firmware in the controller 112, such as a data compression block 130 and an encryption block 132. The data compression block 130 applies lossless data compression to input data sets during write operations, and subsequently provides data de-compression during read operations. The encryption block 132 provides any number of cryptographic functions to input data including encryption, hashes, decompression, etc.

A device management module (DMM) 134 supports back end processing operations and may include an outer code engine circuit 136 to generate outer code, a device I/F logic circuit 137 and a low density parity check (LDPC) circuit 138 configured to generate LDPC codes as part of the error detection and correction strategy used to protect the data stored by the by the SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via one or more channels (lanes) 146.

Figure 3:
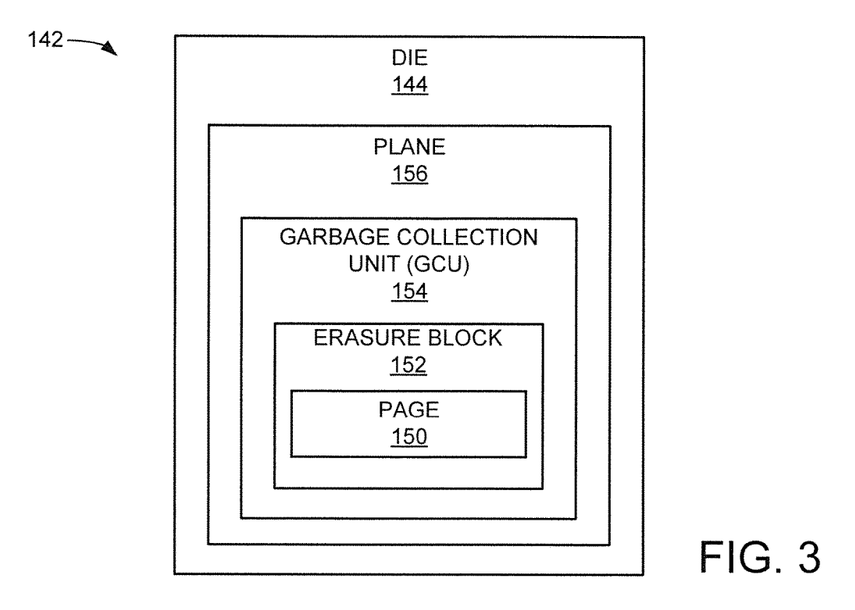
FIG. 3 shows an arrangement of the flash memory of FIG. 2 in some embodiments.

FIG. 3 shows an arrangement of the various flash memory dies 144 in the flash memory 142 of FIG. 2 in some embodiments. Other configurations can be used. The smallest unit of memory that can be accessed at a time is referred to as a page 150. A page may be formed using a number of flash memory cells that share a common word line. The storage size of a page can vary; current generation flash memory pages can store, in some cases, 16 KB (16,384 bytes) of user data.

A number of pages are integrated into an erasure block 152, which represents the smallest grouping of memory cells that can be concurrently erased in a NAND flash memory. A number of erasure blocks 152 can be arranged into a garbage collection unit (GCU) 154, which may utilize erasure blocks across different dies as explained below. GCUs can be allocated for the storage of data. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells. The GCU may then be returned to an allocation pool for subsequent allocation to begin storing new user data.

Each die 144 may include a plurality of planes 156. Examples include two planes per die, four planes per die, etc. although other arrangements can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
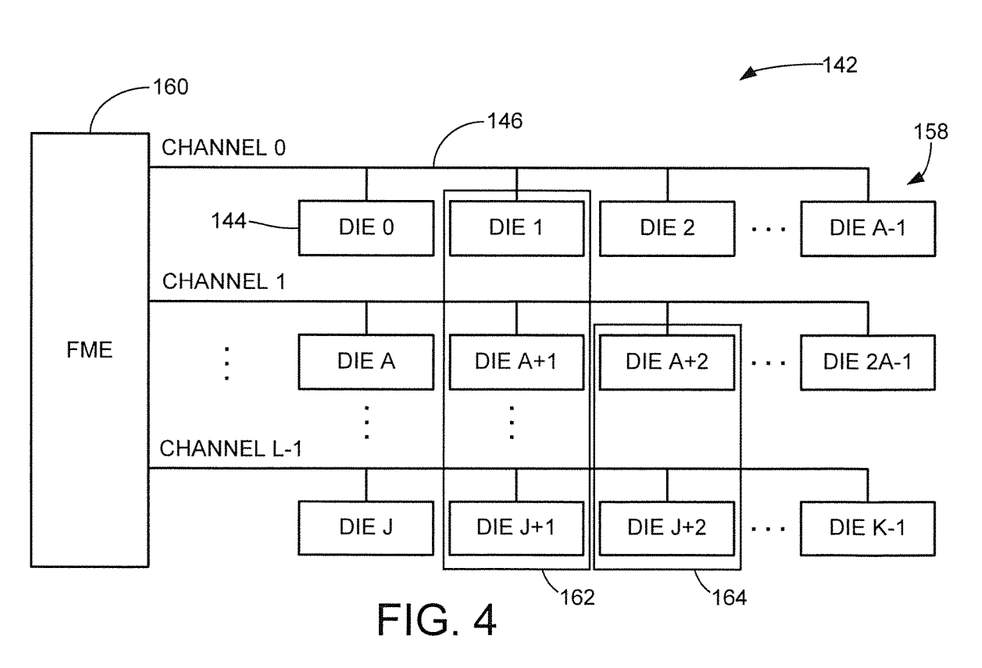
FIG. 4 illustrates the use of channels to access the dies in FIG. 3 in some embodiments.

FIG. 4 shows further aspects of the flash memory 142 in some embodiments. A total number K dies 144 are provided and arranged into physical die groups 158. Each die group 158 is connected to a separate channel 146 using a total number of L channels. In one example, K is set to 128 dies, L is set to 8 channels, and each physical die group has 16 dies. As noted above, a single die within each physical die group can be accessed at a time using the associated channel. A flash memory electronics (FME) circuit 160 of the flash memory module 142 controls each of the channels 146 to transfer data to and from the dies 144.

In some embodiments, the various dies are arranged into one or more NVMe sets. An NVMe set represents a portion of the storage capacity of the SSD that is allocated for use by a particular host (user/owner). NVMe sets are usually established with a granularity at the die level, so that some percentage of the total available dies 144 will be allocated for incorporation into a given NVMe set.

A first example NVMe set is denoted at 162 in FIG. 4. This first set 162 uses a single die 144 from each of the different channels 146. This arrangement provides fast performance during the servicing of data transfer commands for the set since all eight channels 146 are used to transfer the associated data. A limitation with this approach is that if the set 162 is being serviced, no other NVMe sets can be serviced during that time interval. While the set 162 only uses a single die from each channel, the set could also be configured to use multiple dies from each channel, such as 16 dies/channel, 32 dies/channel, etc.

A second example NVMe set is denoted at 164 in FIG. 4. This set uses dies 144 from less than all of the available channels 146. This arrangement provides relatively slower overall performance during data transfers as compared to the set 162, since for a given size of data transfer, the data will be transferred using fewer channels. However, this arrangement advantageously allows the SSD to service multiple NVMe sets at the same time, provided the sets do not share the same (e.g., an overlapping) channel 146.

Figure 5:
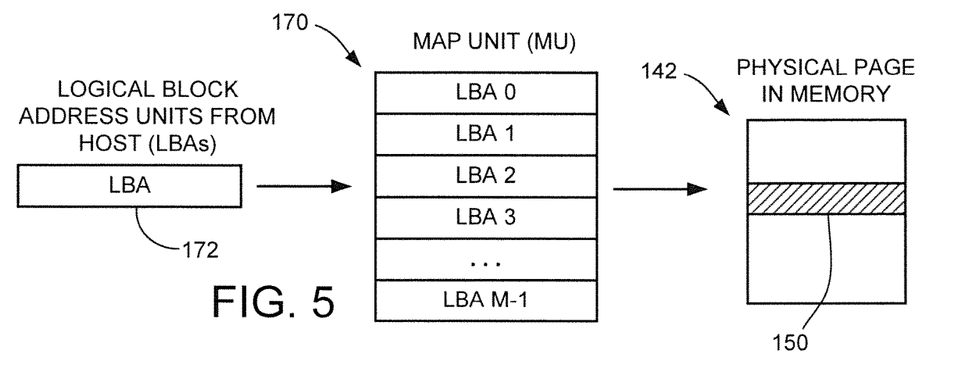
FIG. 5 illustrates a map unit (MU) as a data arrangement stored to the flash memory of FIG. 2.

FIG. 5 illustrates a manner in which data may be stored to the flash memory module 142. Map units (MUs) 170 represent fixed sized blocks of data that are made up of one or more user logical block address units (LBAs) 172 supplied by the host. Without limitation, the LBAs 172 may have a first nominal size, such as 512 bytes (B), 1024B (1 KB), etc., and the MUs 170 may have a second nominal size, such as 4096B (4 KB), etc. The application of data compression may cause each MU to have a smaller size in terms of actual bits written to the flash memory 142.

The MUs 170 are arranged into the aforementioned pages 150 (FIG. 3) which are written to the memory 142. In the present example, using an MU size of 4 KB, then nominally four (4) MUs may be written to each page. Other configurations can be used. To enhance data density, multiple pages worth of data may be written to the same flash memory cells connected to a common control line (e.g., word line) using multi-bit writing techniques; MLCs (multi-level cells) write two bits per cell, TLCs (three-level cells) write three bits per cell; XLCs (four level cells) write four bits per cell, etc.

Data stored by an SSD are often managed using metadata. The metadata provide map structures to track the locations of various data blocks (e.g., MUAs 170) to enable the SSD 110 to locate the physical location of existing data. For example, during the servicing of a read command it is generally necessary to locate the physical address within the flash memory 144 at which the most current version of a requested block (e.g., LBA) is stored, so that the controller can schedule and execute a read operation to return the requested data to the host. During the servicing of a write command, new data are written to a new location, but it is still necessary to locate the previous data blocks sharing the same logical address as the newly written block so that the metadata can be updated to mark the previous version of the block as stale and to provide a forward pointer or other information to indicate the new location for the most current version of the data block.

Figure 6:
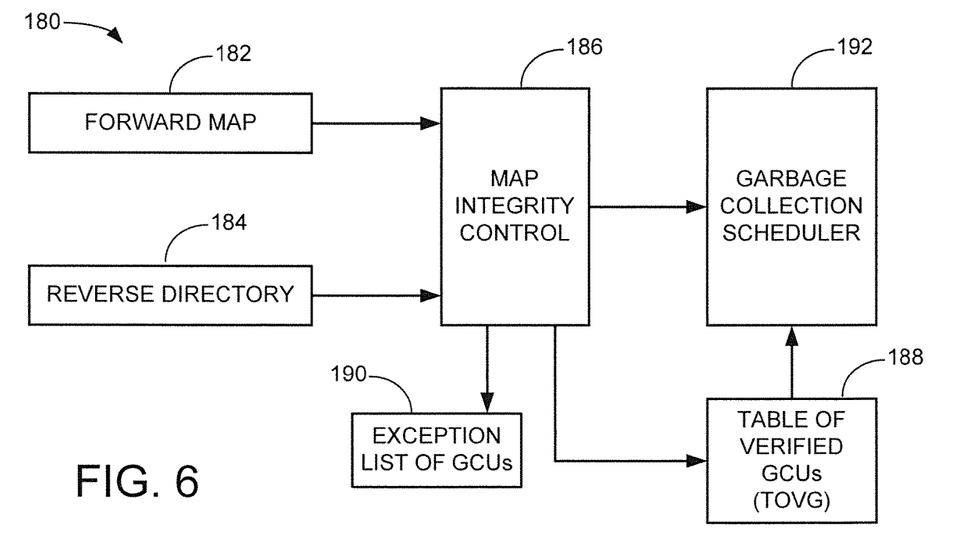
FIG. 6 displays a functional block diagram for a GCU management circuit of the SSD in accordance with some embodiments.

FIG. 6 shows a functional block diagram for a GCU management circuit 180 of the SSD 110 in accordance with some embodiments. The circuit 180 may form a portion of the controller 112 and may be realized using hardware circuitry and/or one or more programmable processor circuits with associated firmware in memory. The circuit 180 includes the use of a forward map 182 and a reverse directory 184. As noted above, the forward map and reverse directory are metadata data structures that describe the locations of the data blocks in the flash memory 142. During the servicing of host data transfer operations, as well as other operations, the respective portions of these data structures are located in the flash memory or other non-volatile memory location and copied to local memory 120 (see e.g., FIG. 2).

The forward map 182 provides a flash transition layer (FTL) to generally provide a correlation between the logical addresses of various blocks (e.g., MUAs) and the physical addresses at which the various blocks are stored (e.g., NVMe set, die, plane, GCU, EB, page, bit offset, etc.). The contents of the forward map 182 may be stored in specially configured and designated GCUs in each NVMe set.

The reverse directory 184 provides a physical address to logical address correlation. The reverse directory contents may be written as part of the data writing process to each GCU, such as in the form of a header or footer along with the data being written. Generally, the reverse directory provides an updated indication of how many of the data blocks (e.g., MUAs) are valid (e.g., represent the most current version of the associated data).

The circuit 180 further includes a map integrity control circuit 186. As explained below, this control circuit 186 generally operates at selected times to recall and compare, for a given GCU, the forward map data and the reverse directory data. This evaluation step includes processing to determine if both metadata structures indicate the same number and identify of the valid data blocks in the GCU.

If the respective forward map and reverse directory match, the GCU is added to a list of verified GCUs in a data structure referred to as a table of verified GCUs, or TOVG 188. The table can take any suitable form and can include a number of entries, with one entry for each GCU. Each entry can list the GCU as well as other suitable and useful information, such as but not limited to a time stamp at which the evaluation took place, the total number of valid data blocks that were determined to be present at the time of validation, a listing of the actual valid blocks, etc.

Should the control circuit 186 find a mismatch between the forward map 182 and the reverse directory 184 for a given GCU, the control circuit 186 can further operate to perform a detailed evaluation to correct the mismatch. This may include replaying other journals or other data structures to trace the history of those data blocks found to be mismatched. The level of evaluation required will depend on the extent of the mismatch between the respective metadata structures.

For example, if the forward map 182 indicates that there should be some number X valid blocks in the selected GCU, such as 12 valid blocks, but the reverse directory 184 indicates that there are only Y valid blocks, such as 11 valid blocks, and the 11 valid blocks indicated by the reverse directory 184 are indicated as valid by the forward map, then the focus can be upon the remaining one block that is valid according to the forward map but invalid according to the reverse directory. Other mismatch scenarios are envisioned.

The mismatches can arise due to a variety of factors such as incomplete writes, unexpected power surges or disruptions that prevent a full writing of the state of the system, etc. Regardless, the control circuit can expend the resources as available to proactively update the metadata. In some embodiments, an exception list 190 may be formed as a data structure in memory of GCUs that have been found to require further evaluation. In this way, the GCUs can be evaluated later at an appropriate time for resolution, after which the corrected GCUs can be placed on the verified list in the TOVG 188.

It will be noted that the foregoing operation of the control circuit 186 in evaluating GCUs does not take place once a garbage collection operation has been scheduled; instead, this is a proactive operation that is carried out prior to the scheduling of a garbage collection operation. In some cases, GCUs that are approaching the time at which a garbage collection operation may be suitable, such as after the GCU has been filled with data and/or has reached a certain aging limit, etc., may be selected for evaluation on the basis that it can be expected that a garbage collection operation may be necessary in the relatively near future.

Figure 8:
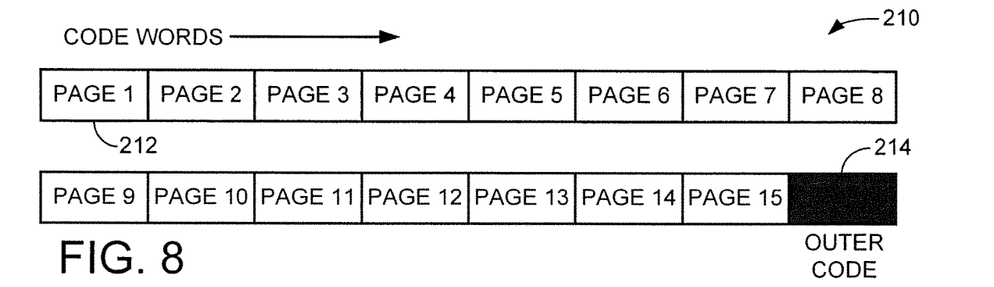
FIG. 8 illustrates an example data set that can be written to the data storage device of FIG. 1 in accordance with assorted embodiments.

FIG. 8 further shows the GCU management circuit 180 to include a garbage collection scheduler circuit 192. This circuit 192 generally operates once it is appropriate to consider performing a garbage collection operation, at which point the circuit 192 selects from among the available verified GCUs from the table 188. In some cases, the circuit 192 may generate a time of completion estimate to complete the garbage collection operation based on the size of the GCU, the amount of data to be relocated, etc.

As will be appreciated, a garbage collection operation can include accessing the forward map and/or reverse directory 182, 184 to identify the still valid data blocks, the reading out and temporary storage of such blocks in a local buffer memory, the writing of the blocks to a new location such as in a different GCU, the application of an erasure operation to erase each of the erasure blocks in the GCU, the updating of program/erase count metadata to indicate the most recent erasure cycle, and the placement of the reset GCU into an allocation pool awaiting subsequent allocation and use for the storage of new data sets.

Figure 7:
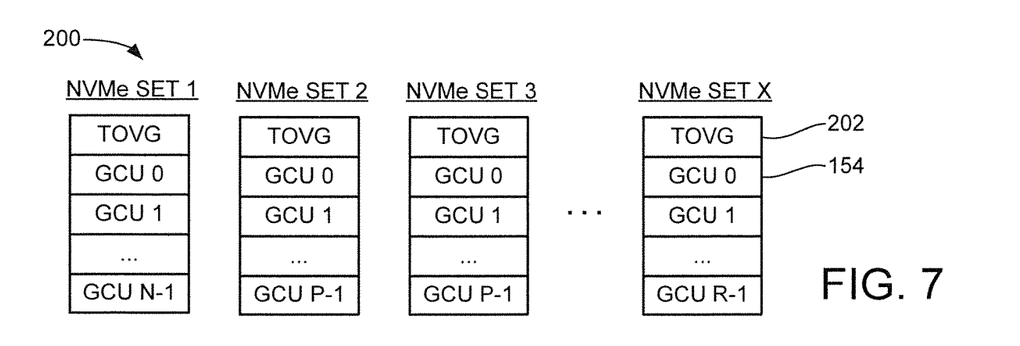
FIG. 7 represents an arrangement of various GCUs and corresponding tables of verified GCUs (TOVGs) for a number of different NVMe sets in some embodiments.

FIG. 7 shows a number of NVMe sets 200 that may be arranged across the SSD 110 in some embodiments. Each set 200 may have the same nominal data storage capacity (e.g., the same number of allocated dies, etc.), or each may have a different storage capacity. The storage capacity of each NVMe set 200 is arranged into a number of GCUs 154 as shown. In addition, a separate TOVG (table of verified GCUs) 202 may be maintained by and in each NVMe set 200 to show the status of the respective GCUs. From this, each time that it becomes desirable to schedule a garbage collection operation, such as to free up new available memory for a given set, the table 202 can be consulted to select a GCU that, with a high degree of probability, can be subjected to an efficient garbage collection operation without any unexpected delays due to mismatches in the metadata (forward map and reverse directory).

FIG. 8 illustrates a manner in which a parity data set 210 can be written to a selected GCU 154 in the flash memory 142 in accordance with some embodiments. In this example, it is contemplated that the selected GCU 154 is formed from sixteen (16) erasure blocks 152, with each of the erasure blocks disposed on a different die 144. Other sizes can be used as desired.

In FIG. 8, the parity data set has fifteen (15) user data pages 212, with each user data page, or payload, written to a different one of the dies. More generally, the GCU has N erasure blocks on a corresponding N dies, and payloads 212 are written to N−1 of the dies. The Nth die receives an outer code (parity value), which is represented at 214. As mentioned above, the outer code may be generated by summing the page data in a buffer using an XOR function. Because the parity data set 210 has data boundaries that nominally match the GCU boundaries, the parity data set in FIG. 8 is referred to as a standard parity data set since the data matches the available memory.

Figure 9:
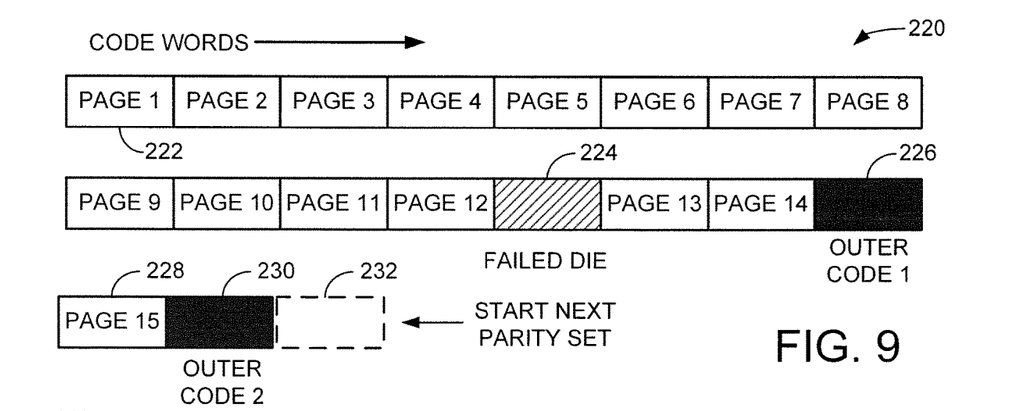
FIG. 9 is an example non-standard data set that may occur in the data storage device of FIG. 1 in accordance with various embodiments.

FIG. 9 shows a non-standard parity data set 220. The parity data set 220 is the same size as the parity data set 210 in FIG. 8 in that, as before, the parity data set 220 has a total of fifteen (15) pages/payloads 222. However, one of the dies 144 has experienced a failure, as indicated at 224, so that the GCU only spans 15 dies.

Accordingly, the controller circuit 112 (FIG. 2) operates to write a full set of the available pages, which in this case is Page 1 to Page 14, through the available dies. This is followed by the writing of a first outer code (parity value) in the Nth location, as shown at 226, which protects the payloads (Page 1 to Page 14) written during this first pass through the available dies.

A leftover payload 228 (Page 15) is written to the next available page in the first die (such as adjacent Page 1). This leftover payload is referred to as a runt or runt data, and represents the remainder after an integer number of passes have been made through the available dies. Once all of the leftover payloads have been written, a second outer code (parity value) is written in the next available die, as shown at 230. This second outer code is disposed in the same die as, and is adjacent to, the Page 2 payload.

In this way, when leftover (runt) payload sets remain, these are written to as many additional dies as are required, followed by the writing of a final parity value to cover the runts. Map data may be generated to note the non-standard outer code arrangement. This provides a parity data set with a parity value to protect each pass through the dies, plus another parity value to cover the remainder.

While FIG. 9 shows the non-standard parity data set has arisen due to a non-standard sized available memory (e.g., due to the die failure at 224), other non-standard parity data sets can arise based on other factors. For example, a particular data set to be written to a given NVMe set may make up a total number of MUs that do not align with the GCU boundaries. In another case, data compression or other processing may result in a non-standard sized parity data set. It will be appreciated that if a given GCU has N dies, then a non-standard sized data set will have a total number M payloads (or portions thereof) that are not divisible by N without a remainder. The remainder could be any value from one extra payload up to N−1 extra payloads. Regardless, each pass through the dies will be parity protected, irrespective of the overall length of the parity data set.

Once a non-standard parity set is written, map data may be generated and stored to indicate the fact that the parity data set is of non-standard length. Information may be stored in the map data such as how much longer the data set is in terms of additional pages in the remainder, the location of the last parity value (e.g., 230), etc. To maximize data density, the controller may operate to initiate the writing of the next parity data set at the next available page on the next die in the sequence, as shown at 232 in FIG. 9.

Figure 10:
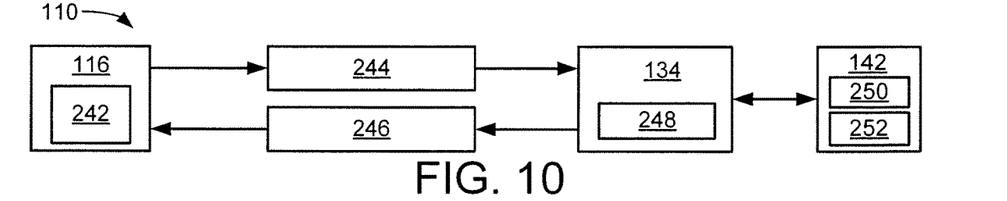
FIG. 10 shows a functional block representation of an example data storage device configured in accordance with some embodiments.

FIG. 10 shows a functional block representation of additional aspects of the SSD 110. The core CPU 116 from FIG. 2 is shown in conjunction with a code management engine (CME) 212 that can be used to manage the generation of the respective code words and outer code parity values for both standard and non-standard parity data sets During write operations, input write data from the associated host are received and processed to form MUs 170 (FIG. 5) which are placed into a non-volatile write cache 244 which may be flash memory or other form(s) of non-volatile memory. The MUs are transferred to the DMM circuit 134 for writing to the flash memory 142 in the form of code words that contain user data, inner code, and outer code. During read operations, one or more pages of data are retrieved to a volatile read buffer 246 for processing prior to transfer to the host.

The CME 242 determines the appropriate inner and outer code rates for the data generated and stored to memory. In some embodiments, the DMM circuit 134 may generate both the inner and outer codes. In other embodiments, the DMM circuit 134 generates the inner codes (see e.g., LDPC circuit 138 in FIG. 2) and the core CPU 116 generates the outer code words. In still other embodiments, the same processor/controller circuit generates both foul's of code words. Other arrangements can be used as well. The CME 242 establishes appropriate code rates for both types of code words.

During generation of the outer codes, a parity buffer 248 may be used to successively XOR each payload being written during each pass through the dies. Both payload data 250 and map data 252 will be stored to flash 142.

Figure 11:
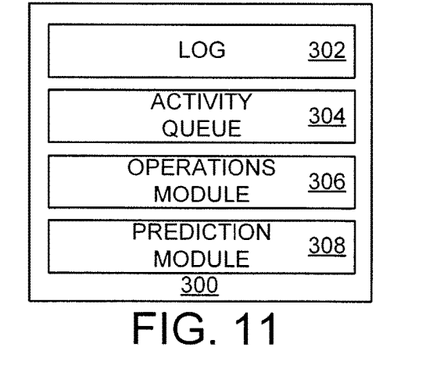
FIG. 11 conveys an example wear range module that can be employed in a data storage device in accordance with various embodiments.

FIG. 11 displays an example wear range module 260 that can be utilized in a data storage device in accordance with assorted embodiments. The wear range module 260 may be resident in a data storage device as circuitry activated by a local device controller, such as controller 102, to mitigate any expansion of and, if possible lower, a wear range for a memory of the data storage device, such as memory 104.

The wear range module 260 can compile one or more logs 262 that track past data access activity for one or more EBs of a memory. It is noted that the wear range module log 262 can concurrently store activity, such as data writes, data reads, garbage collection activity, map updates, and journal locations, for any number of different EBs of the data storage device. That is, the log 3262 may be assigned to store activity that has occurred only in the memory, or portion of the memory, of the data storage device itself instead of in devices attached to the wear range module via a wired and/or wireless network.

One or more activity queues 264 can be maintained, or accessed by the wear range module 300 to track the future data access operations planned for one or more EBs of a data storage device. In contrast to the log 262, the activity queue is forward looking and can be updated, as directed by the device controller, to ensure the wear range module 260 identifies the data access operations to be performed on various EBs of a memory. The log 262 and activity queue 264 provide information to an operations module 266 that generates operations to mitigate, and reduce, the wear range of one or more EBs of a memory.

For instance, the operations module 266 may identify a wear range computed for an EB by the wear range module 260 is above a predetermined threshold and issues a command to prioritize read commands before write or erase commands to an EB. As another non-limiting example, the operations module 266 may issue a command to delay garbage collection operations to a high PE cycle count EB and/or move the physical block address of a write command to an EB with a lower PE cycle count.

While the operations module 266 can react to existing conditions in a data storage device, the wear range module 260 can be configured to also handle anticipated wear range activity with a prediction module 268. The prediction module 268 can access at least the log 262 of data access activity to determine if a wear range event is likely to occur. If the prediction module 268 forecasts that a wear range between EBs will become too great based on scheduled operations in the activity queue 264, the wear range module 262 can take one or more actions to proactively mitigate, or prevent, a predicted wear range event, such as an EB exceeding a predetermined PE cycle count.

Figure 12:
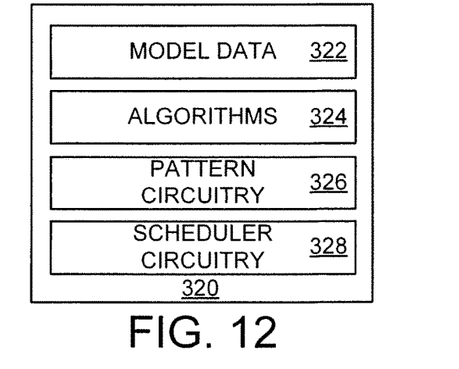
FIG. 12 depicts a block representation of an example prediction module that can be utilized by the wear range module of FIG. 13 in accordance with some embodiments.

FIG. 12 illustrates a block representation of an example prediction module 268 that can be employed in the wear range module 260 of FIG. 11 in accordance with some embodiments. The prediction module 268 can store, and/or access, model data 270 that provides past data access operations information. For example, the model data 270 can be information about other memories that is utilized by the prediction module 268 to forecast data access, data maintenance, and data mapping operations for the data storage device in which the prediction module 268 is resident.

The prediction module 268 may utilize one or more different algorithms 272 that are adapted, over time, based on past predicted events to calculate a forecasted number of PE cycles for a particular EB of a memory. The algorithms 272 may be used in conjunction with pattern circuitry 274 that is configured to identify patterns in past, and scheduled, data access activity to accurately predict future PE cycle counts for various memory EBs. The pattern circuitry 274 may access a scheduled activity queue, such as queue 264, to forecast the potential future impact of identified patterns. Also, the pattern circuitry 274 can identify patterns that trigger data access errors, faults, and conflicts that can be avoided to optimize data storage operations.

As a result of any predicted events and/or PE cycle counts for one or more EBs, a scheduler circuitry 276 of the prediction module 268 can take action to modify the order, number, and/or destination of one or more queued data access commands and/or data maintenance operations to modify the PE cycle count for at least one EB. The scheduler circuitry 276 may delay, move, or prioritize data storage activity and provide an estimated PE cycle count as a result of such activity modification. The ability to conduct intelligent proactive activity to control the PE cycle count, and wear range, of EBs in a memory optimizes current, and future, operation of a data storage device.

Figure 13:
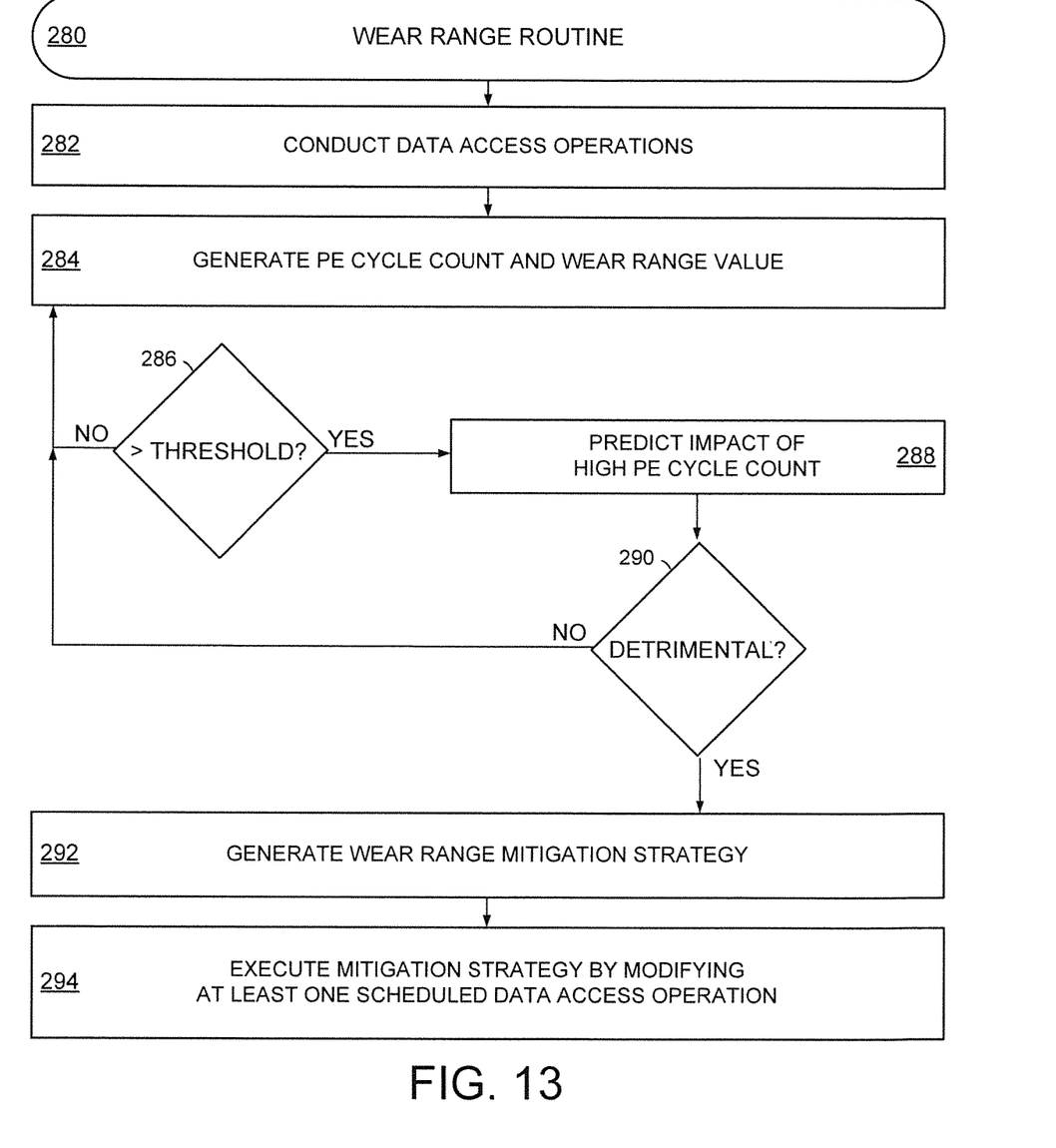
FIG. 13 provides a wear range routine that can be carried out with the assorted embodiments of FIGS. 1-12.

A wear range routine 280 is shown in FIG. 13 that can be conducted with the various embodiments of FIGS. 1-12 to optimize wear ranges and data access operations. Any number of data access operations can be carried out, as scheduled, in step 282. The various data access operations are interpreted in step 284 to generate PE cycle counts for various EBs of a memory and a resulting wear range.

Decision 286 evaluates if the wear range of one or more EBs is above a predetermined threshold. It is noted that there may be more than one threshold that separately trigger different data access request, and EB, management. If the wear range of a memory is below the threshold, the routine 280 returns to step 282. However, a wear range of greater than the predetermined threshold triggers step 288 to utilize a prediction module to forecast the performance impact of the high number of PE cycles for an EB. Step 288 can determine the high number of PE cycles has a temporary effect on the wear range for the memory, has a permanent effect, and/or is likely to be detrimental to data storage device performance, such as with higher data access errors and faults.

Decision 290 evaluates the predicted impact and determines if the high PE cycle count necessitates reactive, and/or proactive, actions. If so, step 292 generates a wear range mitigation strategy with a wear range module. The mitigation strategy can be executed in step 294 to carry out one or more actions, such as altering EB size and modifying queued data access operations. It is noted that the number and duration of actions carried out in step 294 is not limited and data storage performance of a device can be optimized in a variety of reactive and proactive manners.

What is claimed is:

1. A method comprising:
   arranging a semiconductor memory into a plurality of erasure blocks accessed by a controller to store data;
   generating an access count for each respective erasure block;
   computing a wear range for the semiconductor memory based on the respective access counts with the controller;
   evaluating a performance impact of the wear range with the controller; and
   altering a deterministic window of a first erasure block of the plurality of erasure blocks proactively in response to the performance impact.

2. The method of claim 1, wherein the wear range corresponds with a difference between a first access count of a first erasure block of the plurality of erasure blocks and a second access count of a second erasure block of the plurality of erasure blocks.

3. The method of claim 2, wherein the first access count is the highest access count of any erasure block of the plurality of erasure blocks and the second access count is the lowest access count of any erasure block of the plurality of erasure blocks.

4. The method of claim 1, wherein the wear range is continuously monitored by the controller.

5. The method of claim 1, wherein the deterministic window of the first erasure block is delayed.

6. The method of claim 1, wherein the deterministic window of the first erasure block moved to a second erasure block of the plurality of erasure blocks.

7. The method of claim 1, wherein the deterministic window of the first erasure block is altered by reducing its length.

8. The method of claim 1, wherein the deterministic window of the first erasure block is altered in response to the access count exceeding a predetermined threshold value.

9. The method of claim 1, wherein the deterministic window of the first erasure block is altered reactively after detecting a change in the first erasure block.

10. The method of claim 1, wherein the deterministic window of the first erasure block is altered by prioritizing read commands to the first erasure block.

11. A method comprising:
    arranging a semiconductor memory into a plurality of erasure blocks accessed by a controller to store data;
    generating an access count for each respective erasure block;
    computing a wear range for the semiconductor memory based on the respective access counts with the controller;
    evaluating a performance impact of the wear range with the controller;
    generating a range mitigation strategy with the controller in response to the performance impact; and
    altering a deterministic window of a first erasure block of the plurality of erasure blocks proactively in accordance with the wear mitigation strategy.

12. The method of claim 11, wherein a wear range module of the controller generates the access counts for the respective erasure blocks of the plurality of erasure blocks.

13. The method of claim 11, wherein an operations module of the controller reacts to detected data access conditions by delaying garbage collection activity to the first erasure block.

14. The method of claim 11, wherein a prediction module of the controller predicts a future increase in the wear range for the semiconductor memory, the controller altering the deterministic window based on the predicted future increase.

15. The method of claim 11, wherein a prediction module of the controller adapts at least one algorithm over time in response to logged data access operations to the plurality of erasure blocks.

16. The method of claim 15, wherein the prediction module identifies at least one pattern in a data access log with a pattern circuit.

17. The method of claim 11, wherein the deterministic window is altered by changing a destination of at least one pending data access command.

18. The method of claim 11, wherein the deterministic window is altered to provide a greater uniformity in data read accesses to the first erasure block.

19. An apparatus comprising a semiconductor memory having a plurality of erasure blocks connected to a controller, with each respective erasure block having an access count corresponding with a number of data accesses and a wear range computed by the controller based on the respective access counts, the controller configured to evaluate a performance impact of the wear range and alter a deterministic window of a first erasure block of the plurality of erasure blocks proactively in response to the performance impact.

20. The apparatus of claim 19, wherein the wear range is a temporary effect on the semiconductor memory.

* * * * *